United States Patent [19]
Hagedorn et al.

[11] Patent Number: 5,425,667
[45] Date of Patent: Jun. 20, 1995

[54] METHOD, MAGAZINE STRIP AND APPARATUS FOR ATTACHING BENDABLE CLIPS TO AN OBJECT

[75] Inventors: Ewald Hagedorn, Hamburg; Manfred Plewa, Verden, both of Germany

[73] Assignee: technopack Ewald Hagedorn KG (GmbH & Co), Glinde, Germany

[21] Appl. No.: 167,861

[22] PCT Filed: Jun. 22, 1992

[86] PCT No.: PCT/EP92/01404

§ 371 Date: Dec. 15, 1993

§ 102(e) Date: Dec. 15, 1993

[87] PCT Pub. No.: WO93/00265

PCT Pub. Date: Jan. 7, 1993

[30] Foreign Application Priority Data

Jun. 20, 1991 [DE] Germany .......... 41 20 440.9

[51] Int. Cl.6 ............................................ A22C 11/12
[52] U.S. Cl. .................................. 452/48; 452/46
[58] Field of Search .................................. 452/48, 46

[56] References Cited

U.S. PATENT DOCUMENTS

| | | | |
|---|---|---|---|
| 3,009,156 | 11/1961 | Lerner | 1/48 |
| 3,380,226 | 4/1968 | Tracy | 53/138 |
| 3,504,838 | 4/1970 | Cairatti | 227/89 |
| 4,044,450 | 8/1977 | Raudys et al. | 452/48 |
| 4,570,841 | 2/1986 | Olessen | 227/95 |
| 4,709,450 | 12/1987 | Stanley et al. | 452/48 |
| 4,796,332 | 1/1989 | Stanley | 452/48 |

*Primary Examiner*—Willis Little
*Attorney, Agent, or Firm*—Chilton, Alix, & Van Kirk

[57] ABSTRACT

A process, a storage line and a device for applying U-shaped bending staples (17) to an object (6) to be bound are disclosed. The staples are produced and stored as straight little rods (4). They are coded and if necessary bent into the U-shape by means of the stroke of the closing machine before being transferred to the closing station of the machine.

12 Claims, 1 Drawing Sheet

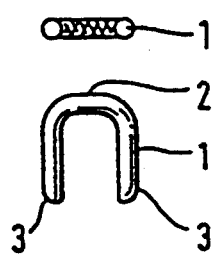
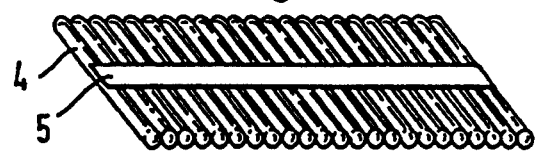
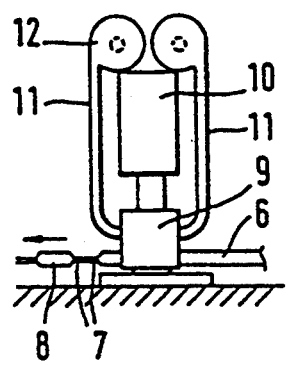
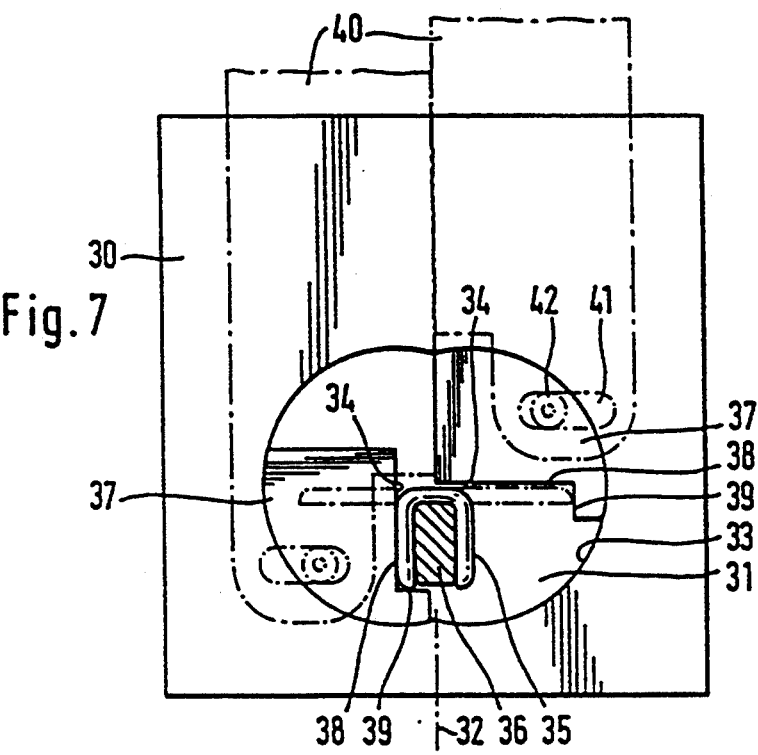
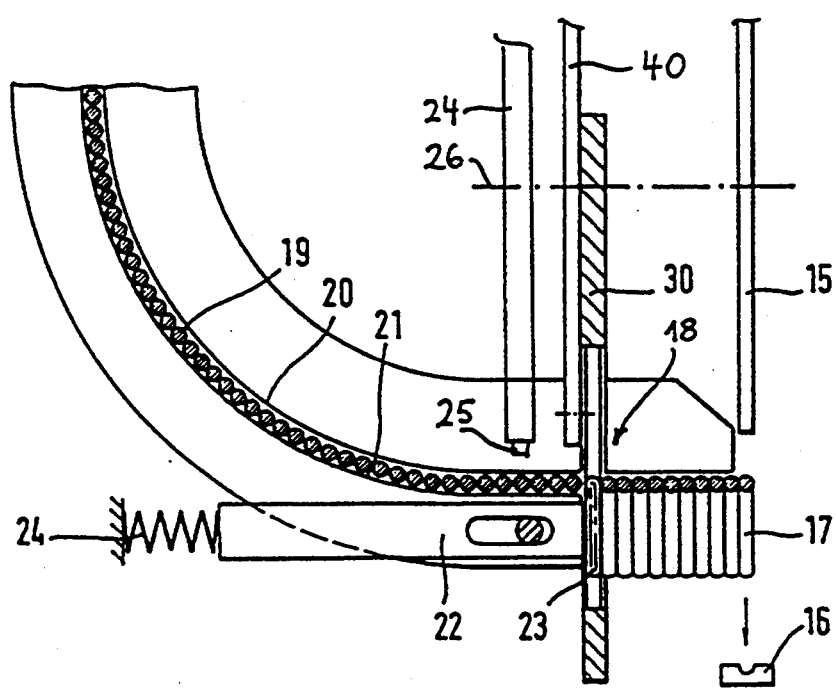

METHOD, MAGAZINE STRIP AND APPARATUS FOR ATTACHING BENDABLE CLIPS TO AN OBJECT

It is known for bendable clips for closing packing sheaths, particularly for closing the ends of sausage casings, to be individually prefabricated in U-shape, to be joined to one another to form flexible magazine strips, to be introduced into the magazine of a closing machine and to be bent around the object which is to be tied by a machine stroke in a closing station of said machine (DE-A-24 10 332). The U-shaped configuration also includes clips of this kind in which the legs form an obtuse angle with the web connecting them (DE-OS 32 44 979). It is known for such prefabricated U-shaped clips to be provided with a code, which for example indicates the initials of the processing firm. After the clips have been produced this code can be applied to the back of the web by a special stamping operation. For this purpose only the length of the web is then of course available.

It is known to print a code, for example the packing or expiry date, on closure ties of paper or plastic material stiffened by wire inserts. Since these closure clips transmit only slight closing forces and therefore there is no risk of damage to the packed object through cut-off ends, it is customary to process them from an endless stock, the printing being applied to the endless strip in a printer disposed upstream of or integrated into the closing machine.

In the case of bendable clips of wire material, Coding with changing day-to-day dates is unknown. In the first place, there is no room on the web of the clips preformed in U-shape. Secondly, the stamping can be done only by the manufacturer of the clips, who would always have to supply exact ordered quantities for each packing date which is to be marked on the clips, and these exact quantities would then also have to be used on the day marked, as otherwise they would be unutilizable. A procedure of this kind is therefore unacceptable.

The problem underlying the invention is therefore that of providing a method which enables bendable clips of wire material to be coded in conformity with consumption on a length which can be greater than that of the web.

The solution provided by the invention comprises a method of applying markings to objects closed by a bendable clip of wire material, wherein small wire rods prefabricated and magazined individually and in an unbent form are coded and bent around the object by means of one and the same machine stroke. The small rods have a vacant coding surface and are fed from a magazine strip in which they are arranged in a row parallel to one another. They are profiled to form a coding surface and are arranged in a row with their coding surfaces identically oriented. It is based on two very different prerequisites. One of these is that the clips should not be supplied already in a U-shape, as was customary hitherto, but in an unbent form, so that they can be stamped with a code marking over a length which is greater than the length of the web. The other consists of the realization that the coding can be applied very inexpensively if it is coupled to the closing operation. The machine stroke bending the clip around the object to be tied can be used simultaneously for stamping the code. In addition, the same machine stroke can be used for preforming the clips in a U-shape.

The additional advantage is thereby gained that the clips prefabricated and magazined in the form of small straight rods take up substantially less space than the clips hitherto prefabricated and magazined in a U-shape, and therefore are substantially more convenient to handle. The magazines contain a larger number of small rods and therefore need less frequent replenishing in the closing machines.

It is true that in nailing and stapling machines working with U-shaped clips it is known to prefabricate and magazine the latter in an unbent shape and to bend them into a U-shape only in the stapling or nailing apparatus (U.S. Pat. Nos. 3,009,156, 3,504,838 and 4,570,841); but in any case coding is out of the question for nailing and stapling clips, as these are too thin. It was also not a self-suggesting step for bendable clips, which are to be bent around an object, to be prefabricated and magazined in an unbent shape, because it appeared simpler to effect the preforming in U-shape as part of the prefabrication process instead of leaving it to the user, who cannot be assumed to have engineering experience and whose machines are consequently kept as simple as possible. Thanks to the coupling of the coding to the closing operation in one and the same machine stroke, the machine can nevertheless be made relatively simple and easy to supervise.

The prefabrication of the individual small clip rods makes it possible for their ends, their cross-section and/or their surface to be suitably shaped. In particular, the ends can be rounded so that the risk of damage to the objects to be tied is eliminated. They may also be given a transverse orientation, for example with grooving on the side which is to cooperate with the object to be tied, and with a free surface for the coding on the other side. With this transverse orientation they are fastened in the magazine strip in such a manner that the transverse orientation is retained in the closing machine.

An essential advantage of the invention also consists in that the same clip blanks in the form of small rods can be used for different types of clips having the same overall length but different leg and web lengths. Without impairing versatility of use, the number of types of clip blanks to be kept in stock for that purpose is reduced in this way.

The term "small rod" is intended to indicate that such rods are substantially straight. No restrictive statement regarding cross-sectional shape is thereby made. They may for example have a round, oval, trapezoidal or flat band-shaped cross-sectional shape. The same applies to the term "wire material".

By "machine stroke" is to be understood the entire movement cycle of the drive required for the closing of a clip. According to the invention the coding and bending of the clips also take place within this cycle, although it is not essential for them to take place simultaneously with the closing operation or in the direction of the stroke movement effecting the closing operation. This is however advantageous.

The magazine strip according to the invention comprising bendable clips arranged in a row and intended to be fed to a closing apparatus for the purpose of carrying out the abovedescribed method is distinguished in that the clips are in the form of small unbent rods which are arranged in a row parallel to one another and which have a transverse orientation and are arranged in a row with the same orientation. They are preferably bonded together by a longitudinally extending carrier band; there may also be a plurality of such bands.

The magazine strips can be joined to a magazine carrier in such a manner that they can be mounted, inserted or exchanged together with the latter without the strips or strip parts which form the magazine charge falling apart. This magazine carrier may consist of containers (for example sleeves, drums or cassettes) which receive the magazine strips in a more or less closed form, so that their individual layers cannot fall apart on insertion or exchange. They may also be coil hubs or the like, on which the wound magazine strip is held. In the case of closing machines in the form of so-called double clippers, that is to say in which two magazine strips enter from opposite sides, this results in an advantageous symmetrical arrangement of the magazines.

The apparatus for bending the bendable clips around an object is distinguished according to the invention in that in the feed path for the bendable clips it contains, upstream of the closing station, a coding station and optionally a bending station in which the clips prefabricated in the form of small straight rods are bent into a U-shape. The tools provided in the coding or bending station are connected to the same drive as the tools of the closing station, preferably in such a manner that they are driven by a common stroke movement.

The bending tool provided expediently comprises a pair of swivel jaws which drive in a swiveling movement the clip legs which are to be moved. A shorter relative movement is thus achieved between the clip legs and the bending tools than for example in the case of a bending tool driving the clip leg as it slides past. This is particularly the case when the center of rotation of the swivel jaws is situated close to the point at which the legs of the clip merge into the web, because then the smallest possible relative movement between the swivel jaw and the clip leg takes place. Abrasion and wear are thus avoided.

The legs should have exactly equal lengths, since the clip will otherwise be tilted in the closing tools. This is also achieved more easily with swivel jaws than with a bending tool sliding along the clips which are to be bent. For centering purposes the swivel jaws can be provided with end stops.

The coding and bending tools are expediently driven by a slide which is moved in synchronism with the closing ram and which may be more or less rigidly connected to the latter.

The claims which refer to the bending apparatus may merit protection independently of the superordinate claims.

The most important result of the invention consists in that the clip blanks in the form of small rods can more easily be provided in the closing apparatus with a stamped or printed coding (for example an indication of date of use) than clip blanks which have been subjected to complete or preliminary bending. The coding apparatus provided in the closing apparatus therefore acts on the clip blanks while they are still in the straight state, that is to say before or during the bending operation.

The invention is explained more fully below with reference to the drawing, which illustrates one advantageous exemplary embodiment and in which:

FIGS. 1 and 2 show a clip in the U-shaped state ready for use,

FIG. 3 shows a clip blank in the form of a rod,

FIG. 4 shows a magazine strip composed of a multiplicity of small rods,

FIG. 5 shows schematically the whole arrangement of a machine according to the invention, FIG. 6 shows a side view, partly in section, of the part of the machine comprising the bending station and the closing station, and FIG. 7 shows the bending station viewed in the direction in which the clips are fed.

The clips ready for use shown in FIGS. 1 and 2 comprise legs 1 which are substantially parallel to one another and which are joined to one another by a web 2 extending at right angles to them. The ends 3 of the legs are more sharply rounded on the outer side than on the sides facing one another. In addition, the web and the leg may be provided on the inner side with grooving as indicated in FIG. 1. These properties have already been provided in the small rod 4 shown in FIG. 3. The small rod is thus not a simple body of revolution, but on the contrary has a transverse orientation. In the magazine strip shown in FIG. 4 all the small rods 4 are joined to one another by a band 5 in such a manner that they all have the same transverse orientation, which is so selected that the side which is subsequently to form the inner side of the clip faces transversely away from the direction of the strip, while the side facing in the opposite direction is free to receive the coding.

The theoretically endless magazine strip is expediently formed into large magazine units, which are not illustrated, for example in the form of rolls or packets comprising several hundred or thousand small rods. The magazines of the closing machines therefore need to be refilled only relatively seldom.

FIG. 5 shows a machine for implementing the invention, in the form of a so-called double clipper, which on a strip of packings 6, for example a sausage, places on each closing stroke two neighboring clips 7 at the end of a preceding packing unit 8 and at the beginning of a following packing unit 8. For this purpose it is equipped with a unit 9 which contains two closing stations arranged side by side and is connected to a drive unit 10. The clips are fed to the closing stations from two symmetrically arranged magazine strip guides 11. The invention makes it possible to equip each of the latter with a magazine 12 of large capacity, while the unit 9 contains, additionally to the closing stations, bending stations for the clips fed in the form of small rods and, at least on one side, a coding station.

FIG. 6 shows the coding, bending and closing station and also the magazine strip guide of one half of this unit 9. The closing station is schematically indicated by a closing ram 15 and a die 16. The respective first clip 17 of the magazine strip is situated between them in a position ready for closing.

The bending station 18 is arranged upstream of the closing station, referring to the direction of feed. The feed distance is as short as possible in order to ensure that in the event of a clip change the number of clips situated therebetween is kept small. The coding station with its ram 24 is situated upstream thereof. The magazine strip 19 of small rods or bent clips is fed between appropriate guide surfaces 20, 21, first to the coding station, then to the bending station and finally to the closing station. It is fed by means of a feed ram 22, the end face of which presses in the conveying direction against the legs of the respective clips 23 which were last bent and which are shown in heavy lines in the drawing. The feed force is supplied by a spring 24, while a displacer is connected to any moving parts of the bending station 18 and pushes the feed ram 22 back when or shortly before each bending operation is carried out, in order to make room for the legs which are to be bent. On completion of the bending operation the displacer recedes, so that the feed ram 22 can once again be placed on the clip last formed.

The coding station comprises a ram 24, at the end of which an exchangeable stamping die 25 is provided. The ram is guided in its longitudinal direction in a guide (not shown). It is arranged in such a manner that on the downward movement of the ram the stamping die 25 strikes centrally on the surface, on which the coding is to be marked, of one of the small rods 21 which is suitably supported on a bottom face, although for the sake of simplicity this is not shown in detail in the drawing.

The arrangement and the function of the bending station can be seen in FIG. 7. In a bearing plate 30, which is shown in section in FIG. 6, a cutout 31 is formed whose contour has approximately the shape of a recumbent figure eight. The symmetrical bounding edges 33 on each side of the center line 32 are circular. Their centers 34 are situated approximately at the points where the point of intersection of the directions of the legs and web of the bent clip 35 is located. The position of the clip is determined by the bending anvil 36, which is arranged symmetrically below the points 34 and is formed by an extension of the guide surface 21.

Two swivel jaws 37 serving as bending tools are situated symmetrically inside the guide cutout 31 and are guided on their outer edge by the inner surfaces 33 of the guide cutout 31 in a swiveling movement, the center of which is formed by the points 34. The swivel jaw appearing on the right in FIG. 7 is shown in its top end swiveled position and the jaw on the left is shown in the bottom end position. It can be seen that the swivel jaws 37 have side surfaces 38 which cooperate with the outer side of the clip legs to convert them from the rod form shown in dot-dash lines into the shape of the U-shaped clip shown in solid lines. Through this arrangement the effect is achieved that the smallest possible relative movement occurs between the swivel jaws and the clip legs. Abrasion and wear are thereby avoided.

The clips should have exactly equal leg lengths. In order to ensure this, the side surface 38 of each swivel jaw 37 terminates in an end stop 39 which projects approximately at right angles from the side surface 38 and cooperates with one end of the small rod in each case. The small rod length should be barely equal to the clear distance between the end stops 39 in their starting position (on the right in FIG. 7). No harm is done if it is slightly shorter, since the clear distance between the end stops is reduced in the first phase of their swiveling movement while the small rod has not yet been bent or has scarcely been bent, so that they can bear against the ends of the small rod. If the rod was previously asymmetrically positioned, it is thereby accurately centered.

In order to hold the swivel jaws 37 in their operative plane, appropriate guide devices are provided, which for the sake of simplicity are omitted from the drawings.

The swivel jaws 37 are driven by means of a slide 40, of which the right-hand half is shown in dot-dash lines in the drawing in the top end position, while the left-hand half is shown in dot-dash lines in the bottom end position. It is understood that the two halves form a unitary whole. The slide 40 cooperates with the swivel jaws 37 with the aid of a slot 41 and a roller 42. Other forms of drive would of course also be conceivable for the swivel jaws 37; however, the drive by means of a slide movable up and down provides in the given context the advantage that the movement of the slide is equal to the movement of the closing ram 15 and of the coding ram 24, so that all three can be connected to one another to form a common drive, as is indicated by the dot-dash line 26. They preferably work synchronously and with the same movement distance, so that they can even be rigidly connected to one another. This contributes towards the simplicity of the arrangement, which is a prerequisite to enable the clips to be reshaped by the user with little expense for investment and servicing. However, this is not essential. For example, a shorter movement distance may be provided for the stamping ram 24.

We claim:

1. A method of applying markings to objects closed by a bendable clip of wire material comprising the steps of providing small wire rods prefabricated and magazined individually and in an unbent form, and coding and bending the rods around the object in a single operation.

2. A method as claimed in claim 1, wherein the coding comprises stamping the rods.

3. A method as claimed in claim 1, wherein the bending step includes preforming the rods into a U-shape before being bent around the object, and the coding takes place as a separate step before preforming into the U-shape.

4. A method as claimed in claim 1 wherein for the purpose of magazining, the small rods are arranged in a row with identical transverse orientation.

5. A method as claimed in claim 4, wherein the small rods have a vacant coding surface and are fed from a magazine strip in which they are arranged in a row parallel to one another.

6. A magazine strip of bendable clips arranged in a row for feeding to a closing station comprising a series of small straight rods (4) arranged in a row parallel to one another, said rods being profiled to form a coding surface and being arranged in a row with their coding surfaces identically oriented.

7. An apparatus for coding a magazine strip of bendable clips of wire material and bending the material around an object to be tied comprising a coding station having a drivable coding tool for marking the clips in the magazine strip, a bending station having a bending tool for initially bending the coded clips, a closing station having a closing tool for closing the bent clips around the object, and a feed path for the magazine strip of bendable clips passing through the coding station and bending station (18) and extending toward the closing station, said apparatus having a drive (10) operable for driving the coding tool, bending tool and closing tool by a common stroke movement.

8. An apparatus as claimed in claim 7, wherein the clips have terminal leg-forming portions and the bending tool provided comprises a pair of swivel jaws (37) which drive in a swiveling movement the leg forming portions which are to be bent.

9. An apparatus as claimed in claim 8, wherein the swivel jaws (37) have end stops (39) for centering the clips.

10. An apparatus as claimed in claim 8, wherein the clips have a web portion intermediate the leg-forming portions and each swivel jaw has a swiveling point arranged close to the desired point of transition from the web portion (1) to the leg portion (2) of the clips (35).

11. An apparatus according to claim 7, wherein the drive includes a slide (40) operatively associated with the bending tool and coding, tool and moved in synchronism with the closing tool.

12. An apparatus according to one of claims 7 to 11, wherein the coding station is arranged upstream of or in the bending station.

* * * * *